United States Patent
Yamafuku et al.

(10) Patent No.: US 9,954,219 B2
(45) Date of Patent: Apr. 24, 2018

(54) ELECTRIC STORAGE DEVICE AND MANUFACTURING METHOD THEREOF

(71) Applicant: GS Yuasa International Ltd., Kyoto-shi (JP)

(72) Inventors: Taro Yamafuku, Kyoto (JP); Masaki Masuda, Kyoto (JP); Kazuki Kawaguchi, Kyoto (JP); Takeshi Sasaki, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 120 days.

(21) Appl. No.: 14/152,933

(22) Filed: Jan. 10, 2014

(65) Prior Publication Data
US 2014/0199589 A1 Jul. 17, 2014

(30) Foreign Application Priority Data

Jan. 11, 2013 (JP) .................. 2013-004095
Dec. 18, 2013 (JP) .................. 2013-261367

(51) Int. Cl.
| H01M 4/36 | (2006.01) |
| H01M 4/04 | (2006.01) |
| H01M 4/136 | (2010.01) |
| H01M 4/1397 | (2010.01) |
| H01M 4/66 | (2006.01) |

(Continued)

(52) U.S. Cl.
CPC .......... *H01M 4/364* (2013.01); *H01M 4/043* (2013.01); *H01M 4/0404* (2013.01); *H01M 4/136* (2013.01); *H01M 4/1397* (2013.01); *H01M 4/663* (2013.01); *H01M 4/667* (2013.01); *H01M 4/622* (2013.01); *H01M 4/661* (2013.01); *H01M 10/0525* (2013.01); *H01M 2004/021* (2013.01)

(58) Field of Classification Search
CPC .............................. H01M 4/364; H01M 4/667
USPC .................................................. 429/121–347
See application file for complete search history.

(56) References Cited

U.S. PATENT DOCUMENTS

| 8,486,564 B2 | 7/2013 | Nagai et al. |
| 2003/0194605 A1 | 10/2003 | Fauteux et al. |

(Continued)

FOREIGN PATENT DOCUMENTS

| JP | 2003-123767 A | 4/2003 |
| JP | 2004-288520 A | 10/2004 |

(Continued)

OTHER PUBLICATIONS

European Search Report dated Jun. 18, 2014.

*Primary Examiner* — James Lee
(74) *Attorney, Agent, or Firm* — McGinn IP Law Group, PLLC

(57) ABSTRACT

Provided is an electric storage device including: a first electrode plate, a second electrode plate having a polarity opposite to that of the first electrode plate, and a separator interposed between the first electrode plate and the second electrode plate, wherein the first electrode plate includes a current collector, a conductive layer laminated onto the current collector, and a mixture layer laminated onto the conductive layer, the mixture layer contains a binder and primary particles of an active material as its constituents, and the primary particles as a constituent of the mixture layer are partially retained in the conductive layer.

19 Claims, 7 Drawing Sheets
(1 of 7 Drawing Sheet(s) Filed in Color)

(51) Int. Cl.
*H01M 4/02* (2006.01)
*H01M 4/62* (2006.01)
*H01M 10/0525* (2010.01)

(56) References Cited

U.S. PATENT DOCUMENTS

| | | |
|---|---|---|
| 2005/0048367 A1 | 3/2005 | Igaki et al. |
| 2005/0241137 A1 | 11/2005 | Suzuki et al. |
| 2007/0025062 A1* | 2/2007 | Miyaki et al. ............... 361/502 |
| 2007/0172733 A1 | 7/2007 | Minami et al. |
| 2009/0246626 A1 | 10/2009 | Tasaki et al. |
| 2010/0209771 A1* | 8/2010 | Shizuka et al. ............... 429/207 |
| 2012/0282525 A1 | 11/2012 | Nagai et al. |
| 2013/0011331 A1 | 1/2013 | Nagai et al. |
| 2013/0209888 A1* | 8/2013 | Nagai .................. H01M 4/131 429/231.1 |
| 2013/0302687 A1 | 11/2013 | Nagai et al. |
| 2014/0199589 A1* | 7/2014 | Yamafuku et al. ........... 429/211 |

FOREIGN PATENT DOCUMENTS

| | | | | |
|---|---|---|---|---|
| JP | 2005-340188 A | 12/2005 | | |
| JP | 2007-227328 A | 9/2007 | | |
| JP | 2010-108703 A | 5/2010 | | |
| JP | 2011-119092 A | 6/2011 | | |
| JP | 2012-109166 A | 6/2012 | | |
| JP | 2012-156109 A | 8/2012 | | |
| JP | 2013-065409 A | 4/2013 | | |
| WO | WO 2011/067982 | * | 6/2011 | ............ H01M 4/525 |
| WO | WO 2012/049779 | * | 4/2012 | ............ H01M 4/525 |

\* cited by examiner

ELECTRIC STORAGE DEVICE AND MANUFACTURING METHOD THEREOF

CROSS-REFERENCE TO RELATED APPLICATIONS

This application claims the benefit of Japanese Patent Application Nos. 2013-004095 and 2013-261367, filed on Jan. 11, 2013 and Dec. 18, 2013, respectively, which are incorporated herein by reference.

FIELD

The present invention relates to an electric storage device and a method for producing the electric storage device.

BACKGROUND

As an electric storage device, nonaqueous electrolyte secondary battery cells such as a lithium ion secondary battery cell are conventionally known. Further, as such a nonaqueous electrolyte secondary battery cell, a battery cell including an electrode group as an electrode assembly and a case housing the electrode group that includes electrode plates respectively having positive and negative polarities is known in general.

Specifically, the electrode group has a positive electrode plate and a negative electrode plate as the electrode plates, the positive electrode plate includes a positive electrode current collector and a positive electrode active material supported on the positive electrode current collector, and the negative electrode plate includes a negative electrode current collector and a negative electrode active material supported on the negative electrode current collector. Further, the electrode group is formed by layering the positive electrode plate, the negative electrode plate, and a separator interposed between the positive electrode plate and the negative electrode plate together. Furthermore, an electrolyte solution is injected in the case.

As a known electrode plate, there can be mentioned, for example, those formed by compressing, in the thickness direction, a stack of a current collector and a mixture layer containing a binder and secondary particles each having a hollow region formed therein by aggregation of a plurality of primary particles (fine particles of several µm) of an active material (see JP 2009-283354 A and JP 2011-119092 A).

The secondary particles with such a hollow structure contained in the mixture layer enhance the penetration of the electrolyte solution into the hollow regions of the secondary particles. This improves the ion conductance of the mixture layer, thereby allowing an electrode plate with an improved conductivity to be obtained. Further, such compression as mentioned above brings the current collector and the active material in the mixture layer to close contact with each other. As a result, an increase in resistance due to the above-mentioned hollow regions is suppressed.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the mixture layer compressed as mentioned above, there are cases where the above-mentioned secondary particles after the compression deforms to return to the shape before the compression because of a time-dependent change in shape of the secondary particles or expansion and contraction of the secondary particles due to repeated charge and discharge. That is, a phenomenon (spring-back) in which the secondary particles after the compression cannot maintain their shape occurs in some cases. When such spring-back occurs, the contact between the current collector and the mixture layer is made loose, which may possibly result in an increase in resistance of the electrode plate.

In view of the above-mentioned problem, it is an object of the present invention to provide an electric storage device in which the increase in resistance is sufficiently suppressed and a method for producing the electric storage device.

An electric storage device according to the present invention includes: a first electrode plate; a second electrode plate having a polarity opposite to that of the first electrode plate; and a separator interposed between the first electrode plate and the second electrode plate, wherein the first electrode plate includes a current collector, a conductive layer laminated onto the current collector, and a mixture layer laminated onto the conductive layer, the mixture layer contains a binder and primary particles of an active material as its constituents, and the primary particles as a constituent of the mixture layer are partially retained in the conductive layer.

BRIEF DESCRIPTION OF DRAWINGS

The patent or application file contains at least one drawing executed in color. Copies of this patent or patent application publication with color drawing(s) will be provided by the Office upon request and payment of the necessary fee.

The foregoing and other features of the present invention will become apparent from the following description and drawings of an illustrative embodiment of the invention in which.

DESCRIPTION OF EMBODIMENTS

An electric storage device according to one embodiment of the present invention includes: a first electrode plate; a second electrode plate having a polarity opposite to that of the first electrode plate; and a separator interposed between the first electrode plate and the second electrode plate, wherein the first electrode plate includes a current collector, a conductive layer laminated onto the current collector, and a mixture layer laminated onto the conductive layer, the mixture layer contains a binder and primary particles of an active material as its constituents, and the primary particles as a constituent of the mixture layer are partially retained in the conductive layer.

According to such a configuration, the primary particles as a constituent of the mixture layer are partially retained in the conductive layer in the first electrode plate, thereby bringing the mixture layer and the conductive layer into comparatively close contact with each other. Moreover, the contact between the conductive layer and the current collecting layer provides a sufficient conductivity between the conductive layer and the current collecting layer.

Accordingly, an electric storage device in which the increase in resistance is sufficiently suppressed can be obtained.

According to one aspect of the electric storage device of this embodiment, the mixture layer further contains secondary particles each having a hollow region formed therein by aggregation of a plurality of the primary particles.

Here, the phrase "having a hollow region formed therein" means not only having therein a hollow region covered by aggregated primary particles but also having therein a hollow region that is partially uncovered by the primary particles. In other words, the hollow region is a region unfilled with the primary particles.

According to another aspect of the electric storage device of this embodiment, the active material contained in the mixture layer is lithium iron phosphate.

According to another aspect of the electric storage device of this embodiment, the primary particles have an average particle size of 100 to 500 nm.

According to another aspect of the electric storage device of this embodiment, a laminated product of the current collector, the conductive layer, and the mixture layer is compressed in the thickness direction by a compressive force of 50 to 500 kgf/cm.

According to another aspect of the electric storage device of this embodiment, the conductive layer contains carbon black.

According to another aspect of the electric storage device of this embodiment, the conductive layer has a thickness of 0.1 to 3.0 μm.

Hereinafter, an electric storage device of this embodiment is described with reference to the drawings by way of example in which the electric storage device is a nonaqueous electrolyte secondary battery cell.

First Embodiment

Figure 1:
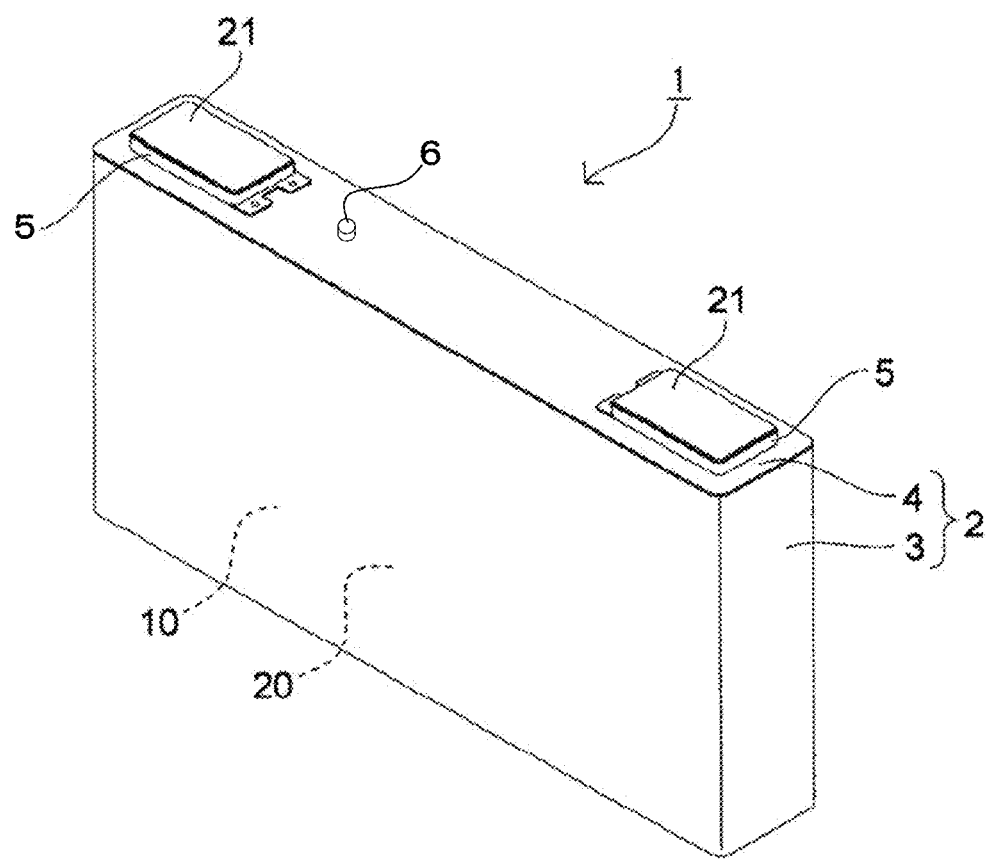
FIG. 1 is a schematic perspective view showing a nonaqueous electrolyte secondary battery cell according to one embodiment of the present invention.
Figure 2:
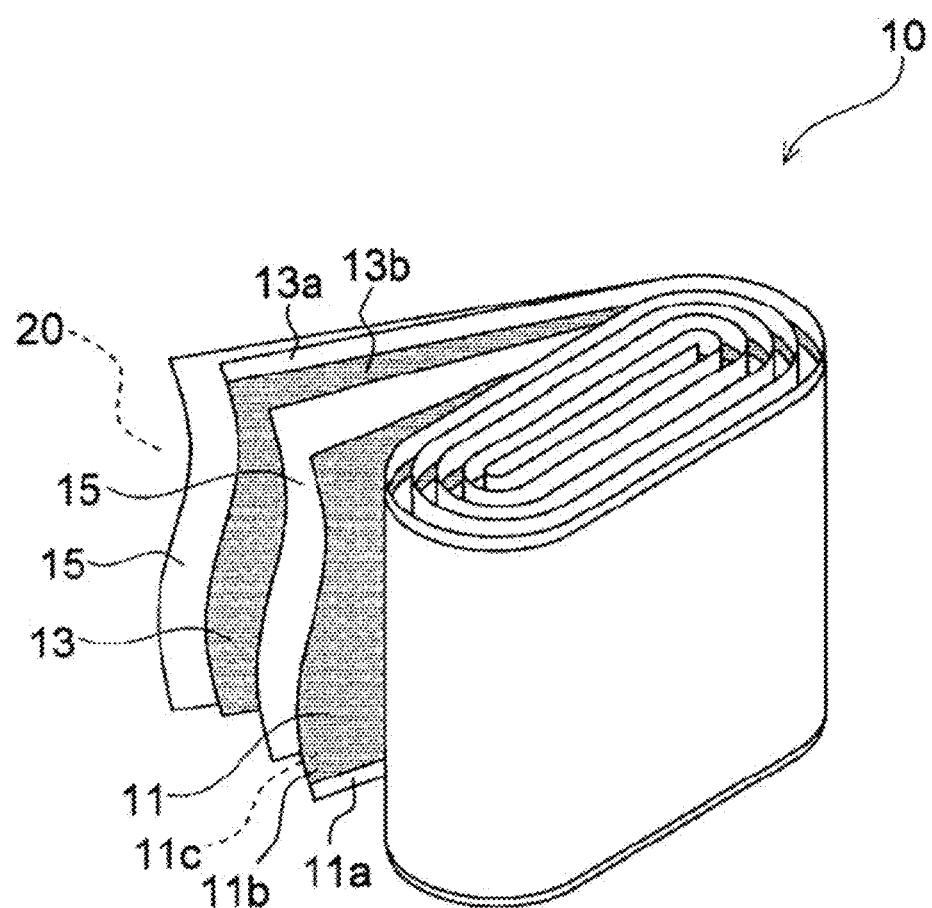
FIG. 2 is a schematic perspective view showing an electrode assembly included in the nonaqueous electrolyte secondary battery cell of this embodiment.

As shown in FIG. 1 and FIG. 2, a nonaqueous electrolyte secondary battery cell 1 as an electric storage device according to this embodiment includes a case 2, an electrode assembly 10 as an electrode group housed in the case 2, and an electrolyte solution 20 as an electrolyte housed in the case 2. The electrode assembly 10 includes a positive electrode plate 11 as a first electrode plate, a negative electrode plate 13 as a second electrode plate having a polarity opposite to that of the positive electrode plate 11, and a separator 15 interposed between these electrode plates. The electrode assembly 10 is formed by layering these components together.

The case 2 includes a box-shaped case body 3 housing the electrode assembly 10 and formed with an opening, and a rectangular cover 4 covering the opening of the case body 3. The case body 3 and the cover 4 are formed, for example, of stainless steel plates, and welded to each other.

Two outer gaskets 5 made of an insulating material are mounted on the outer surface of the cover 4. The cover 4 is formed with two openings. Each of the outer gaskets 5 has one opening. One of the openings of the cover 4 and the opening of one of the outer gaskets 5 are continuous to each other. Likewise, the other of the openings of the cover 4 and the opening of the other of the outer gaskets 5 are continuous to each other. The outer gaskets 5 each houses an external terminal 21 thereinside.

The external terminal 21 projects inwardly of the case body 3 through the opening of the corresponding outer gasket 5 and the opening of the cover 4. The projecting portion of the external terminal 21 is connected to a current collector connected to the positive electrode plate 11 or the negative electrode plate 13 of the electrode assembly 10.

The current collector, for example, has a plate shape, which however is not particularly restrictive. The current collector is formed of the same metal material as the corresponding electrode member to be connected thereto. The external terminal 21 is formed of aluminum or aluminum alloy materials such as aluminum alloy, for example.

A set of the outer gasket 5 and the external terminal 21 is provided for each of the positive electrode and the negative electrode. The outer gasket 5 and the external terminal 21 for the positive electrode are arranged on one end side in the longitudinal direction of the cover 4. The outer gasket 5 and the external terminal 21 for the negative electrode are arranged on the other end side in the longitudinal direction of the cover 4.

The cover 4 has an inlet 6 through which the electrolyte solution 20 is injected into the case body 3. The inlet 6 is sealed after the injection of the electrolyte solution 20.

The electrode assembly 10 is housed in the case body 3. In the case body 3, one electrode assembly 10 may be housed, or a plurality of electrode assemblies 10 may be housed. In the latter case, the plurality of electrode assemblies 10 are connected electrically in parallel to one another.

The positive electrode plate 11 includes a positive electrode current collector 11a, a conductive layer 11c laminated onto the positive electrode current collector 11a, and a positive electrode mixture layer 11b laminated onto the conductive layer 11c.

The positive electrode plate 11 is described later in detail.

The negative electrode plate 13 is formed by disposing a negative electrode mixture layer 13b on a negative electrode current collector 13a such as copper foil. Specifically, the negative electrode plate 13 includes the negative electrode current collector 13a, and the negative electrode mixture layer 13b in the form of a layer containing a negative electrode active material. The negative electrode plate 13 is formed by laminating the negative electrode mixture layer 13b onto the negative electrode current collector 13a.

Examples of the negative electrode active material contained in the negative electrode mixture layer 13b include carbon materials such as amorphous carbon, non-graphitizable carbon, graphitizable carbon, and graphite.

The negative electrode mixture layer 13b may contain a binder such as polyvinylidene fluoride (PVDF), and a conductive additive such as acetylene black, etc., in addition to the above-mentioned negative electrode active material.

The thickness of the negative electrode mixture layer 13b is generally, though not particularly restricted to, about 20 µm to 200 µm.

The separator 15 allows the electrolyte solution 20 to permeate therethrough while blocking electrical connection between the positive electrode plate 11 and the negative electrode plate 13. Examples of the separator 15 include a porous film formed of polyolefin resins such as polyethylene. Such a porous film may contain additives such as a plasticizer, an antioxidant, and a flame retardant.

The electrolyte solution 20 is prepared by dissolving an electrolyte salt in an organic solvent.

The organic solvent used for the electrolyte solution 20 is not particularly limited. Examples thereof include ethers, ketones, lactones, nitriles, amines, amides, sulfur compounds, hydrocarbon halides, esters, carbonates, nitro compounds, phosphate ester compounds, and sulfolane hydrocarbons.

Among these, ethers, ketones, esters, lactones, hydrocarbon halides, carbonates, or sulfolane compounds are preferable.

Examples thereof include tetrahydrofuran, 2-methyltetrahydrofuran, 1,4-dioxane, anisole, monoglyme, 4-methyl-2-pentanone, ethyl acetate, methyl acetate, methyl propionate, ethyl propionate, 1,2-dichloroethane, γ-butyrolactone, dimethoxyethane, methyl formate, dimethyl carbonate, methylethyl carbonate, diethyl carbonate, propylene carbonate, ethylene carbonate, vinylene carbonate, dimethylformamide, dimethylsulfoxide, dimethylthioformamide, sulfolane, 3-methyl-sulfolane, trimethyl phosphate, and triethyl phosphate, and a mixed solvent of them.

The organic solvent is preferably cyclic carbonates or cyclic esters. The organic solvent is most preferably one or a mixture of two or more of ethylene carbonate, propylene carbonate, methylethyl carbonate, and diethyl carbonate.

Further, the electrolyte salt used for the electrolyte solution 20 is not particularly limited. However, examples thereof include $LiClO_4$, $LiBF_4$, $LiAsF_6$, $CF_3SO_3Li$, $LiPF_6$, $LiN(CF_3SO_2)_2$, $LiN(C_2F_5SO_2)_2$, LiI, and $LiAlCl_4$, and a mixture of them.

The electrolyte salt is preferably one or a mixture of two or more of lithium salt selected from $LiBF_4$ and $LiPF_6$.

It should be noted that the electrolyte solution 20 is not specifically limited to an electrolyte solution containing such an organic solvent and electrolyte salt as mentioned above.

Other than above, a film formed of a solid ion conducting material (solid electrolyte film) can be further used complementarily as the electrolyte. In the case of using such a film, the nonaqueous electrolyte secondary battery cell 1 can be formed of the positive electrode plate 11, the negative electrode plate 13, the separator 15 and the solid electrolyte film disposed between these electrode plates, and the electrolyte solution 20. Alternatively, the nonaqueous electrolyte secondary battery cell 1 can be formed of the positive electrode plate 11, the negative electrode plate 13, the solid electrolyte film disposed between these electrode plates, and the electrolyte solution 20.

Further, it is advantageous that the solid electrolyte film be an organic solid electrolyte formed of polyethylene oxide, polyacrylonitrile, or polyethylene glycol, or a modified product of them, when winding the solid electrolyte film, because of the lightweight and flexibility of the organic solid electrolyte. Other than above, the solid electrolyte film can be formed using an inorganic solid electrolyte, or a mixed material of an organic solid electrolyte and an inorganic solid electrolyte.

Figure 4:
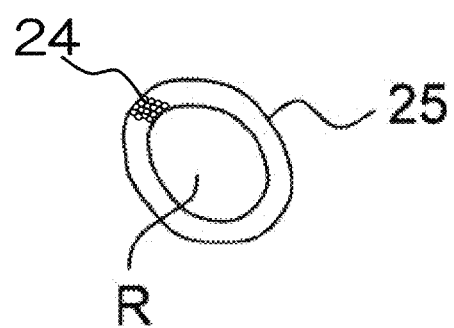
FIG. 4 is a schematic sectional view schematically showing a secondary particle of a positive electrode active material used for the positive electrode plate of this embodiment.

The positive electrode plate 11 of this embodiment includes the positive electrode current collector 11a, the conductive layer 11c laminated onto the positive electrode current collector 11a, and the positive electrode mixture layer 11b laminated onto the conductive layer 11c. Further, the positive electrode mixture layer 11b contains a binder 22 and positive electrode active material particles 23, and the positive electrode active material particles 23 contains primary particles 24 of a positive electrode active material and secondary particles 25 (secondary particle spheres) each having a hollow region R (see FIG. 4) formed therein by aggregation of a plurality of the primary particles 24.

As the positive electrode current collector 11a, an aluminum foil can be mentioned, for example. The thickness of the positive electrode current collector 11a is generally about 10 to 30 µm.

Figure 3:
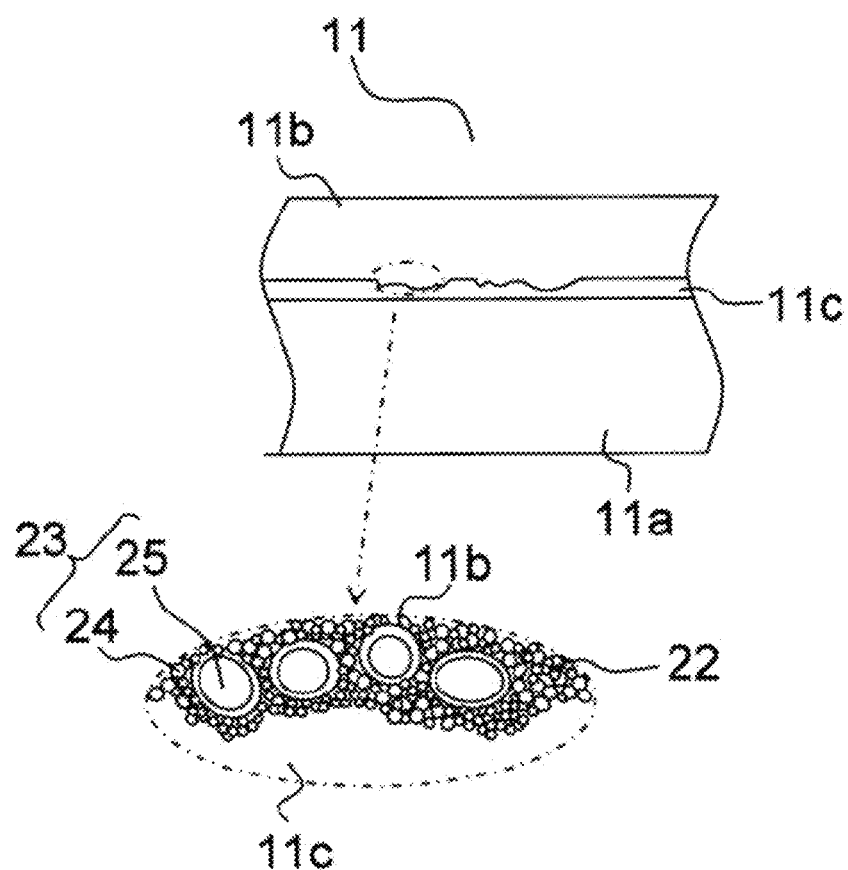
FIG. 3 is a schematic sectional view schematically showing a layer structure of a positive electrode plate of this embodiment.

As shown in FIG. 3, the positive electrode mixture layer 11b contains the binder 22, the primary particles 24 of a positive electrode active material, and the secondary particles 25 (see FIG. 4) each having the hollow region R formed therein by aggregation of a plurality of the primary particles 24. In other words, the positive electrode mixture layer 11b contains the binder 22 and the primary particles 24 of the positive electrode active material. In the positive electrode mixture layer 11b, a plurality of the primary particles 24 partially aggregate so as to form secondary particle spheres each having the hollow region R.

Examples of the binder 22 include polyvinylidene fluoride (PVDF).

Examples of the positive electrode active material include lithium iron phosphate represented by $LiFePO_4$, $LiMnPO_4$, and $Li_3V_2(PO_4)_3$.

The primary particles 24 of the positive electrode active material have an average particle size, for example, of 100 to 500 nm. The average particle size thereof can be measured by SEM observation.

Further, the secondary particles 25 each having the hollow region R formed therein by aggregation of the primary particles 24 is produced, for example, by spray drying.

Specifically, a mixed solution, for example, of lithium hydroxide monohydrate ($LiOH.H_2O$) as a lithium source, iron sulfate heptahydrate ($FeSO_4.7H_2O$) as an iron source, and phosphoric acid ($H_3PO_4$) as a phosphate source is prepared. The thus prepared mixed solution is spray-dried using a spray dryer. As a spray drying apparatus, a spray dryer (manufactured by Ohkawara Kakohki Co., Ltd.), for example, is used. In spray drying, for example, a mixture of the mixed solution and the air is sprayed into the spray dryer through a binary fluid nozzle, followed by drying, with the drying temperature at the inlet of the spray dryer set to 140° C. and the drying temperature at the outlet thereof set to 110° C., which is thereafter sintered at 700° C. for 5 hours under nitrogen airflow. This allows lithium iron phosphate to be synthesized so as to form the primary particles 24 of lithium iron phosphate, and the primary particles 24 of lithium iron phosphate aggregate, thereby producing the secondary particles 25 each having the hollow region R thereinside.

It should be noted that the shape of each secondary particle 25 is not specifically limited, as long as having the hollow region R into which the electrolyte solution 20 can penetrate. Further, the hollow region R formed inside the secondary particle 25 may be covered by aggregates of the primary particles 24, or may be partially not covered by them.

The above-mentioned secondary particles 25 (secondary particle spheres 25) have an average particle size, for example, of 5 to 20 µm. The average particle size thereof can be determined using a laser diffraction particle size distribution analyzer (manufactured by SHIMADZU CORPORATION).

Further, the primary particles 24 as a constituent of the positive electrode mixture layer 11b are partially distributed and retained in the conductive layer 11c.

That is, the positive electrode mixture layer 11b is formed with the primary particles 24 contained in the positive electrode mixture layer 11b partially indenting the conductive layer 11c. Specifically, the positive electrode mixture layer 11b is formed by compression in the thickness direction of a layered stack of the positive electrode current collector 11a, the conductive layer 11c, and the positive electrode mixture layer 11b, as described later. This allows the primary particles 24 contained in the positive electrode mixture layer 11b to indent the conductive layer 11c.

Since the primary particles 24 of the positive electrode mixture layer 11b partially indent the conductive layer 11c, the contact between the positive electrode mixture layer 11b and the conductive layer 11c is less likely to be impaired even when the spring-back is caused by the time-dependent change after the compression or the expansion and contraction due to charge and discharge. That is, the primary particles 24 that have indented the conductive layer 11c function as an anchor. In this way, the positive electrode mixture layer 11b and the conductive layer 11c are stacked together, with the primary particles 24 that function as an anchor being interposed therebetween.

Further, the positive electrode mixture layer 11b may contain secondary particles that have partially lost their hollow regions R because of breakage of the secondary particles 25 by compression, which will be described later.

The positive electrode mixture layer 11b may contain other components such as a conductive additive, in addition to the binder and the positive electrode active material particles 23. Examples of the conductive additive include carbon black and acetylene black.

The thickness of the positive electrode mixture layer 11b is generally, though not particularly restricted to, about 20 µm to 200 µm. Further, the content ratio of the primary particles 24 to the secondary particles 25 in the positive electrode active material particles 23 is not specifically limited, and may be appropriately set depending on the required degree of suppression of the increase in resistance.

The conductive layer 11c is softer than the positive electrode current collector 11a.

Here, the phrase "the conductive layer 11c is softer than the positive electrode current collector 11a" means that Vickers hardness (Hv) of the conductive layer 11c is lower than Vickers hardness of the positive electrode current collector 11a.

Vickers hardness is a value obtained by dividing the load when a pyramidal recess is formed on a surface of a specimen using a diamond indenter in the form of a square pyramid with an angle of 136° between opposite faces by the diagonal length of the recess (as measured by a method in accordance with JIS Z2244).

The Vickers hardness of the conductive layer 11c is not particularly limited, as long as it is lower than Vickers hardness of the positive electrode current collector 11a.

As the difference in Vickers hardness between the conductive layer 11c and the positive electrode current collector 11a, expressed as [(Vickers hardness of the positive electrode current collector 11a)−(Vickers hardness of the conductive layer 11c)], increases, it is easier for the secondary particles 25 in the positive electrode mixture layer 11b to indent (dig) the conductive layer 11c. Thus, there is a tendency that the conductive layer 11c and the positive electrode mixture layer 11b are brought into firmer contact with each other.

Meanwhile, if the above-mentioned difference in Vickers hardness is excessively high, Vickers hardness of the conductive layer 11c is excessively low, which may possibly weaken the strength of the conductive layer 11c. Further, Vickers hardness of the positive electrode current collector 11a is excessively high, which may possibly make it difficult to wind the positive electrode current collector 11a.

Accordingly, the above-mentioned difference, for example, is preferably at least 5 but not more than 35.

Further, Vickers hardness of the conductive layer 11c, for example, is preferably at least 5 but not more than 15.

Further, Vickers hardness of the positive electrode current collector 11a, for example, is preferably at least 20 but not more than 40.

The thickness of the conductive layer 11c is preferably 0.1 to 3.0 µm, more preferably 0.1 to 1.0 µm The conductive layer 11c, for example, contains a conductive agent and a binder. The conductive agent is not specifically limited, as long as it is a conductive material that allows the conductive layer 11c formed using the conductive agent to be softer than the positive electrode current collector 11a.

It should be noted that Vickers hardness of the conductive layer 11c can be appropriately adjusted by changing the kind or amount of the conductive agent to be added. In consideration of such viewpoints, preferable examples of the conductive agent include carbon black, acetylene black, and Ketjen black. Further, the amount of the conductive agent to be added is preferably 10 to 90 mass % with respect to the total mass of the conductive layer 11c.

Further, the binder is not specifically limited, as long as it is a material that is capable of binding the conductive agent to itself, binding the conductive agent to the positive electrode current collector 11a, and binding the conductive agent to the positive electrode mixture layer 11b, and is softer than the positive electrode current collector 11a.

It should be noted that Vickers hardness of the conductive layer 11c can be appropriately adjusted by changing the kind or content amount of the binder. In consideration of such viewpoints, examples of the binder include polyvinylidene fluoride, polyethylene oxide, and chitosan. Further, the content amount of the binder is preferably 10 to 90 mass % with respect to the total mass of the conductive layer 11c.

Further, the conductive layer 11c may contain other components in addition to the conductive agent and the binder. However, such other components may possibly affect Vickers hardness of the conductive layer 11c. Accordingly, the kind and content amount of such other components can be appropriately set in consideration of such viewpoints.

As has been described above, the positive electrode plate 11 of this embodiment includes the conductive layer 11c and the positive electrode mixture layer 11b containing the primary particles 24 of a positive electrode active material and the secondary particles 25 each having the hollow region R formed by aggregation of the primary particles 24, in which the primary particles 24 of the positive electrode mixture layer 11b are partially retained in the conductive layer 11c.

When the primary particles 24 contained in the positive electrode mixture layer 11b are partially retained in the conductive layer 11c, as mentioned above, the positive electrode mixture layer 11b and the conductive layer 11c are brought into comparatively close contact with each other. Further, even if the secondary particles 25 undergo time-dependent changes or expansion and contraction due to repeated charge and discharge, the contact between the positive electrode mixture layer 11b and the conductive layer 11c is suppressed from being made loose. Moreover, the aforementioned anchor function allows a sufficient conductivity to be maintained between the positive electrode mixture layer 11b and the conductive layer 11c.

Meanwhile, the conductivity between the conductive layer 11c and the positive electrode current collector 11a is also maintained sufficient.

Accordingly, the positive electrode plate 11 in which the increase in resistance is more sufficiently suppressed can be obtained.

Further, in the positive electrode plate 11 according to this embodiment, the conductive layer 11c is softer than the positive electrode current collector 11a.

This facilitates indentation of the primary particles 24 contained in the positive electrode mixture layer 11b into the conductive layer 11c when the positive electrode plate 11 is formed by compressing a layered stack of the positive electrode current collector 11a, the conductive layer 11c, and the positive electrode mixture layer 11b in the thickness direction. Accordingly, the contact between the positive electrode mixture layer 11b and the conductive layer 11c is made closer than the contact between the positive electrode mixture layer 11b and the positive electrode current collector 11a. Thus, the positive electrode plate 11 in which the increase in resistance is further sufficiently suppressed can be obtained.

Further, the positive electrode plate 11 of this embodiment is formed so that the primary particles 24 of the positive electrode mixture layer 11b partially indent the conductive layer 11c, by compression in the thickness direction of a layered stack of the positive electrode current collector 11a, the conductive layer 11c, and the positive electrode mixture layer 11b. In this way, the positive electrode mixture layer 11b indents the conductive layer 11c, thereby bringing the positive electrode mixture layer 11b and the conductive layer 11c into closer contact with each other. Therefore, the positive electrode plate 11 in which the increase in resistance is further sufficiently suppressed can be obtained.

Further, the nonaqueous electrolyte secondary battery 1 of this embodiment includes the above-described positive electrode plate 11, and thus the increase in resistance is suppressed therein.

Subsequently, a method for producing an electric storage device (nonaqueous electrolyte secondary battery 1) of this embodiment is described. That is, such a production method includes: an electrode plate producing step of producing electrode plates; and a layering step of layering a first electrode plate and a second electrode plate having a polarity opposite to that of the first electrode plate with a separator interposed therebetween, the electrode plates being produced in the electrode plate producing step, wherein the electrode plate producing step includes: a step of laminating a conductive layer onto a current collector; a step of laminating a mixture layer containing a binder and primary particles of an active material onto the conductive layer; and a step of compressing, in the thickness direction, a laminated product of the current collector, the conductive layer, and the mixture layer.

According to such a configuration, the first electrode plate is formed by compressing a laminated product of the current collector, the conductive layer, and the mixture layer, thereby allowing the primary particles of the mixture layer to be partially retained in the conductive layer. This brings the mixture layer and the conductive layer into comparatively close contact with each other. Moreover, the conductivity between the conductive layer and the current collector is maintained sufficient by the contact between the conductive layer and the current collector.

Accordingly, an electric storage device in which the increase in resistance is sufficiently suppressed can be obtained.

According to one aspect of a method for producing an electric storage device of this embodiment, the mixture layer laminated onto the conductive layer in the step of laminating the mixture layer of the electrode plate producing step further contains secondary particles each having a hollow region formed therein by aggregation of a plurality of the primary particles.

Specifically, the method for producing the nonaqueous electrolyte secondary battery 1 of this embodiment includes a positive electrode plate producing step of producing the positive electrode plate 11 as the electrode plate producing step.

Further, this production method includes the layering step of layering the positive electrode plate 11 as a first electrode plate, which is produced in the positive electrode plate producing step, and the negative electrode plate 13 as a second electrode plate with a separator 15 interposed therebetween.

First, the positive electrode plate producing step is described.

The positive electrode plate producing step includes: a step of laminating the conductive layer 11c that is softer than the positive electrode current collector 11a onto the positive electrode current collector 11a (first lamination step); a step of laminating, onto the conductive layer 11c, the positive electrode mixture layer 11b containing the binder 22, the primary particles 24 of a positive electrode active material, and the secondary particles 25 each having the hollow region R formed thereinside by aggregation of a plurality of the primary particles 24 (second lamination step); and a step of compressing, in the thickness direction, a layered stack of the positive electrode current collector 11a, the conductive layer 11c, and the positive electrode mixture layer 11b (compression step).

Specifically, in the positive electrode plate producing step, a conductive agent, a binder, and an organic solvent such as N-methylpyrrolidone are first mixed, so that a mixture in paste form (conductive layer mixture paste) is prepared. This mixture is applied onto the positive electrode current collector 11a, followed by drying, thereby forming the conductive layer 11c on the positive electrode current collector 11a (first lamination step).

Next, positive electrode active material particles containing the primary particles 24 and the secondary particles 25, a binder, a conductive additive or the like, and an organic solvent such as N-methylpyrrolidone are mixed, so that a mixture in paste form (positive electrode mixture paste) is prepared. This mixture is applied onto the above formed conductive layer 11c, followed by drying, thereby allowing the positive electrode mixture layer 11b to be laminated onto the conductive layer 11c (second lamination step).

Then, the resultant laminated product is compressed using a roll press or the like (compression step).

In this way, the positive electrode plate 11 is produced.

In the positive electrode plate producing step, a conventionally known mixing apparatus is used for preparing the conductive layer mixture paste or the positive electrode mixture paste. Further, a conventionally known coating apparatus and drying apparatus are used for forming the conductive layer 11c or the positive electrode mixture layer 11b.

In the compression step, if the compressive force for compressing the layered stack is excessively small, it is difficult to allow the secondary particles 25 to sufficiently indent the conductive layer 11c. On the other hand, if the compressive force for compressing the layered stack is excessively large, the secondary particles 25 are crushed, which excessively reduces the hollow regions R of the secondary particles 25 in the positive electrode mixture layer 11b. As a result, there is a possibility that sufficient penetration of the electrolyte solution 20 into the positive electrode mixture layer 11b is made difficult.

Accordingly, the compressive force is appropriately set, for example, in consideration of such viewpoints. The compressive force, for example, is preferably set to 50 to 500 kgf/cm.

According to the above-mentioned production method of this embodiment, the positive electrode plate 11 in which the positive electrode mixture layer 11b and the conductive layer 11c are in comparatively close contact with each other as above is produced. Further, the positive electrode plate 11 in which the contact between the positive electrode mixture layer 11b and the conductive layer 11c is closer than the contact between the conductive layer 11c and the positive electrode current collector 11a is produced. Further, the positive electrode plate 11 in which the contact between the positive electrode mixture layer 11b and the conductive layer 11c is suppressed from being made loose, even when the secondary particles 25 undergo time-dependent changes, or expansion and contraction due to repeated charge and discharge is produced. Moreover, the contact between the conductive layer 11c and the positive electrode current collector 11a maintains a sufficient conductivity therebetween. Accordingly, the positive electrode plate 11 in which the increase in resistance is sufficiently suppressed can be obtained.

Subsequently, a negative electrode plate is produced. In producing the negative electrode plate, a negative electrode active material, a binder, a conductive additive or the like, and an organic solvent are mixed, so that a mixture in paste form (negative electrode mixture paste) is obtained. This mixture is applied onto the negative electrode current collector 13a, followed by drying. Thereafter, the resultant laminated product is compressed using a roll press or the like. Thus, the negative electrode plate 13 is produced.

Next, a step of layering the positive electrode plate 11 and the negative electrode plate 13 with the separator 15 interposed therebetween is described.

Specifically, the positive electrode plate 11 and the negative electrode plate 13 produced as above, and the separator 15 are first prepared.

Next, the positive electrode plate 11, the separator 15, the negative electrode plate 13, and the separator 15 are disposed in this order and stacked together.

Thereafter, the stack is wound, thereby forming the electrode assembly 10. Subsequently, the electrode assembly 10 is inserted into the container body 3. Further, current collectors are connected respectively to the positive electrode plate 11 and the negative electrode plate 13. Then, the opening of the container body 3 is covered by the cover 4 with the outer gaskets 5 and the external terminals 21 mounted thereon, and the current collectors are connected respectively to the external terminals 21. In this state, the container body 3 and the cover 4 are welded to each other.

Further, the electrolyte solution 20 is injected into the container 2 through the inlet 6. Finally, the inlet 6 is closed, so that a nonaqueous electrolyte secondary battery cell is produced.

According to the above-mentioned method for producing the nonaqueous electrolyte secondary battery 1 of this embodiment, the nonaqueous electrolyte secondary battery 1 including the above-mentioned positive electrode plate 11 is produced. Therefore, the nonaqueous electrolyte secondary battery 1 in which the resistance is sufficiently suppressed can be obtained.

It should be noted that the method for producing the nonaqueous electrolyte secondary battery 1 of this embodiment is not particularly limited to the production method exemplified above.

As has been described above, the electric storage device and the method for producing the electric storage device according to this embodiment provide an electric storage device in which the increase in resistance is sufficiently suppressed and a method for producing such an electric storage device.

Although the electrode plate, the battery cell, and the method for producing these according to the present invention are as mentioned above, the present invention is not limited to the embodiments mentioned above. The design can be appropriately modified within the scope intended by the present invention.

For example, the present invention may have a configuration in which the binder 22 and the above-mentioned conductive additive or the like mentioned above are partially distributed in the hollow regions R in the positive electrode mixture layer 11b. Further, a configuration in which the negative electrode plate 13 has a conductive layer between the negative electrode current collector 13a and the negative electrode mixture layer 13b, and the negative electrode mixture layer 13b contains secondary particles each having the hollow region R formed thereinside by aggregation of primary particles of a negative electrode active material may be employed.

The battery cell of the present invention is suitable as a nonaqueous electrolyte secondary battery cell, particularly, a lithium ion secondary battery cell, and is further suitable as a large battery cell. However, the battery cell of the present invention is not particularly limited to these.

Further, the present invention is not limited also to those having the actions and effects of the above-mentioned embodiments.

Although the electric storage device and the method for producing the electric storage device according to the aforementioned embodiments are as mentioned above, the present invention is not limited to the embodiments mentioned above as an example. The design can be appropriately modified within the scope intended by the present invention. The operational advantage of the present invention is also not limited to the foregoing embodiments.

The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

EXAMPLES

Next, the present invention is described further in detail by way of examples. However, the present invention is not limited to these examples.

<Production of Lithium Iron Phosphate (LiFePO$_4$) Secondary Particles Each Having a Hollow Region>

A mixed solution of lithium hydroxide monohydrate (LiOH.H$_2$O) as a lithium source, iron sulfate heptahydrate (FeSO$_4$.7H$_2$O) as an iron source, phosphoric acid (H$_3$PO$_4$) as a phosphate source at a molar ratio of 1:1:1 was prepared.

The mixed solution prepared above was spray-dried using a spray dryer (manufactured by Ohkawara Kakohki Co., Ltd.). In spray drying, a mixture of the mixed solution and the air was sprayed into the spray dryer through a binary fluid nozzle so as to be dried at a drying temperature at the inlet of 140° C. and a drying temperature at the outlet of 110° C. After the drying, the dried product was sintered at 700° C. for 5 hours under nitrogen airflow. In this way, lithium iron phosphate as a positive electrode active material was synthesized, and primary particles of lithium iron phosphate aggregate, thereby producing secondary particles each having a hollow region thereinside. The average particle size of the thus produced secondary particles was measured using a laser diffraction particle size distribution analyzer (manufactured by SHIMADZU CORPORATION). As a result, their average particle size was 10 μm (in all the following experiments, the same method was employed for measuring average particle sizes).

<Production of Lithium Iron Phosphate (LiFePO$_4$) Secondary Particles Having No Hollow Regions (Solid Particles)>

A mixed solution of lithium hydroxide monohydrate (LiOH.H$_2$O) as a lithium source, iron sulfate heptahydrate (FeSO$_4$.7H$_2$O) as an iron source, and diammonium hydrogenphosphate (NH$_4$H$_2$PO$_4$) as a phosphate source was further mixed well in a mortar. Thereafter, the resultant product was calcined at 300° C. for 3 hours under nitrogen airflow. The resultant calcined product was pulverized to obtain smaller pellets, which thereafter were sintered at 300° C. for 3 hours in the air. In this way, non-hollow solid lithium phosphate particles were obtained. The thus produced secondary particles had an average particle size of 10 μm.

<Production of a Positive Electrode Plate Having a Conductive Layer>

First, 50 mass % of carbon black as a conductive agent and 50 mass % of PVDF were mixed. To this mixture was added N-methylpyrrolidone as a solvent. Thus, a conductive agent mixture paste was prepared. The conductive layer mixture paste was applied to each of both sides of an aluminum foil with a thickness of 20 μm as a positive electrode current collector so as to form a conductive layer of 0.02 g/100 cm$^2$. It was further dried, and thus a conductive layer was formed.

Meanwhile, 80 mass % of positive electrode active material particles including the above produced secondary particles of the positive electrode active material each having a hollow region or 80 mass % of positive electrode active material particles including the above produced solid secondary particles of the positive electrode active material, 10 mass % of acetylene black as a conductive additive, and 10 mass % of PVDF were mixed. To this mixture was added N-methylpyrrolidone as a solvent. Thus, a positive electrode mixture paste was prepared. The positive electrode mixture paste was applied to each of both sides of an aluminum foil with a thickness of 10 μm as a positive electrode current collector so as to form a positive electrode mixture layer of 1.5 g/100 cm$^2$. It was further dried, and thus the positive electrode mixture layer was formed on a conductive layer.

Thereafter, the above produced layered stacks were each subjected to compression molding with a load of 100 kgf/cm using a roll press. Thus, strip-shaped positive electrode plates were produced. Each positive electrode member had a length of 500 cm, a width of 10 cm, and a thickness of 180 μm in total of each positive electrode current collector, and the conductive layers or the positive electrode mixture layers on both sides of the positive electrode current collector.

Vickers hardness of the positive electrode current collector and the conductive layer in each positive electrode plate 11 was measured, using a dynamic ultra micro hardness tester (DUH-211S, manufactured by SHIMADZU CORPORATION) which functions as a Vickers hardness meter, under specific conditions according to JIS Z2244. They respectively had a hardness of 30 and 10.

<Production of Positive Electrode Plate without Having Conductive Layer>

A positive electrode plate was produced in the same manner as above except that the above-mentioned conductive layer was not formed. That is, a positive electrode mixture paste containing secondary particles, each having a hollow region, of a positive electrode active material, or alternatively, a positive electrode mixture paste containing solid secondary particles of the positive electrode active material was applied onto each of both surfaces of an aluminum foil as a positive electrode current collector so as to form a positive electrode mixture layer of 1.5 g/100 cm$^2$. It was further dried, and thus a positive electrode mixture layer was formed. Thereafter, the positive electrode mixture layer was subjected to compression molding with a load of 100 kgf/cm using a roll press. Thus, each positive electrode plate in the form of a strip was produced. The positive electrode member had a length of 500 cm, a width of 10 cm, and a thickness of 175 μm in total of the positive electrode current collector and the positive electrode mixture layers on both sides thereof.

<Production of a Negative Electrode Plate>

90 mass % of a negative electrode active material, 2 mass % of acetylene black as a conductive additive, and 8 mass % of PVDF were mixed. To this mixture was added N-methylpyrrolidone as a solvent. Thus, a negative electrode mixture paste was prepared. The negative electrode mixture paste was applied to each of both sides of a copper foil as a negative electrode current collector having a thickness of 10 μm so as to form a negative electrode mixture layer of 0.8 g/100 cm$^2$. It was further dried, and thus the negative electrode mixture layer was formed. Thereafter, the above produced layered stack was subjected to compression molding with a load of 100 kgf/cm using a roll press. Thus, a strip-shaped negative electrode plate was produced. The negative electrode member had a length of 500 cm, a width of 10 cm, and a thickness of 120 μm in total of the negative electrode current collector, and the negative electrode mixture layers on both sides of the negative electrode current collector.

<Production of Test Battery Cells>

A positive electrode tab and a negative electrode tab were attached respectively to the positive electrode plate and the negative electrode plate produced as above.

Further, a microporous polyolefin film having a width of 12 cm and a thickness of 25 μm was prepared as a separator.

Next, the positive electrode plate, a separator, the negative electrode plate, and a separator were disposed in layers in this order, which were further wound into an elongated cylindrical shape. Thus, an electrode assembly was produced. The electrode assembly was housed in a case body, and a cover was mounted on the case. Furthermore, an electrolyte solution was injected into the case. Thus, test battery cells were each produced.

<Charge and Discharge Cycle Test>

Using each test battery cell, a capacity retention test was conducted.

Specifically, the resistance of the battery cell after being charged at a current of 1 CA to a voltage of 4.1 V, followed by being discharged at a current of 1 CA to a voltage of 2.5 V was measured using a impedance meter (manufactured by HIOKI E.E. CORPORATION). The resistance as measured at a frequency of 1 kHz using the AC impedance method was expressed as percentage (%) with the resistance of a cell including a non-hollow solid layer and a conductive layer being defined as 100% (resistance ratio).

Figure 5:
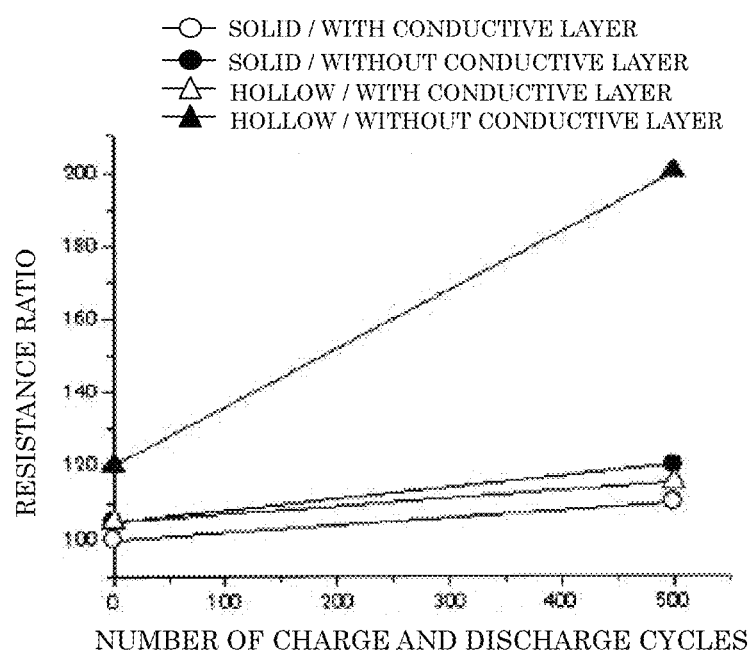
FIG. 5 is a graph showing a relationship between the number of charge and discharge cycles and the resistance ratio of each test battery cell.
Figure 6:
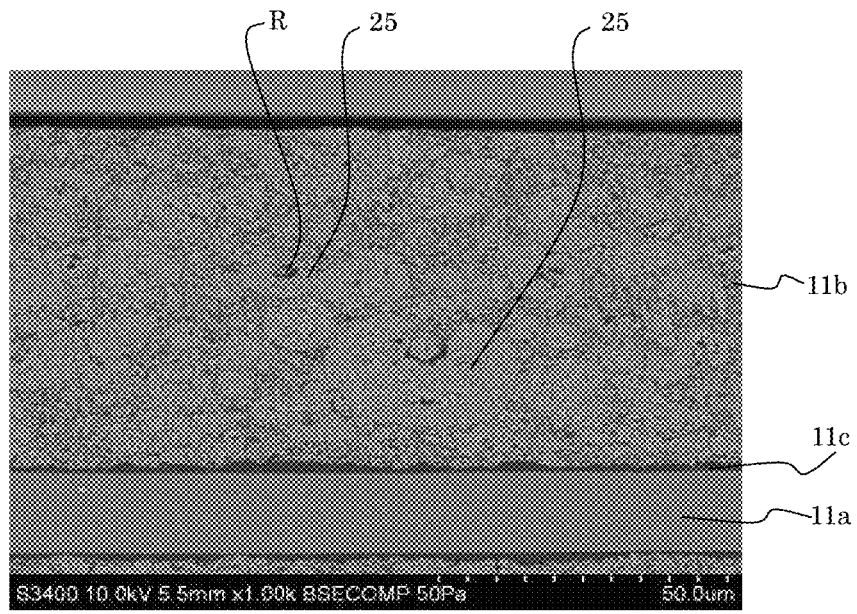
FIG. 6 is a picture of a cross section in the thickness direction of a positive electrode plate observed by SEM.
Figure 7:
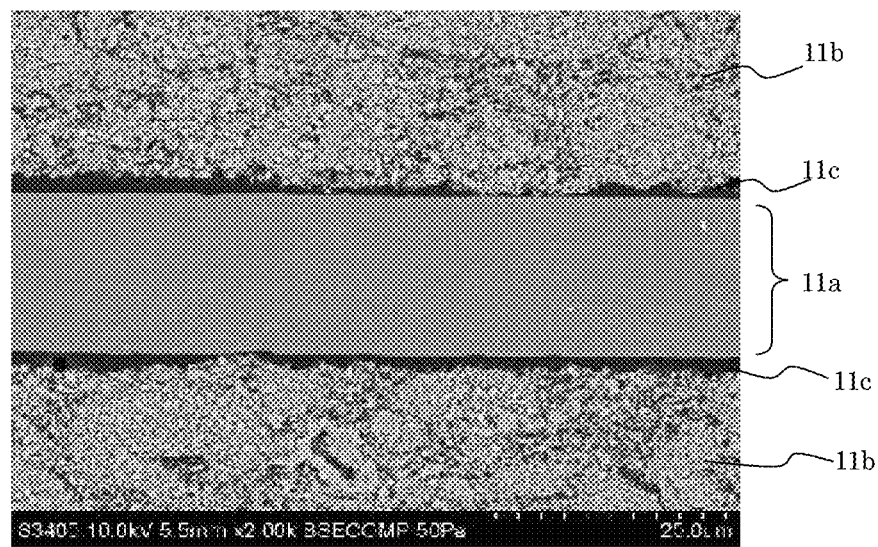
FIG. 7 is a picture of the cross section in the thickness direction of the positive electrode plate observed by SEM.

Next, this test battery cell was subjected to 500 cycles of charge and discharge under the same charge and discharge conditions. Thereafter, the resistance thereof was measured in the same manner as above, and the resistance ratio (%) was calculated. FIG. 5 shows the results.

In FIG. 5, the result of a test battery cell in which the positive electrode active material particles are solid particles, and the positive electrode plate has a conductive layer is shown by "white circles ○". Further, the result of a test battery cell in which the positive electrode active material particles are solid particles, and the positive electrode plate has no conductive layer is shown by "black circles ●". Furthermore, the result of a test battery cell in which the positive electrode active material particles are second particles each having a hollow region, and the positive electrode plate has a conductive layer is shown by "white triangles Δ". Moreover, the result of a test battery cell in which the positive electrode active material particles are second particles each having a hollow region, and the positive electrode plate has no conductive layer is shown by "black triangles ▲".

As shown in FIG. 5, the test battery cell in which the solid positive electrode active material particles were used was little affected in the increase in resistance at the beginning and during the charge and discharge cycles by the presence or absence of a conductive layer.

On the other hand, the test battery cell, having no conductive layer, in which the positive electrode active material particles containing second particles each having a hollow region were used had a high resistance from the beginning, and the increase in resistance during the charge and discharge cycles also was significant. In contrast, in the case of the test battery cell having a conductive layer, the increase in resistance was remarkably suppressed both at the beginning and during the charge and discharge cycles, as compared to the case of the test battery cell having no conductive layer.

FIG. 6 to FIG. 9 each show a picture of a cross section of the positive electrode plate observed by SEM. The magnification was 1,000 times in FIG. 6, 2,000 times in FIG. 7, and 10,000 times in FIG. 8.

A positive electrode plate for the observation was produced in the same manner as above except that the conductive agent mixture paste was applied so as to form a conductive layer of 1.4 g/m². It should be noted that the positive electrode plate produced for the observation had the conductive layer, and the conductive layer of the positive electrode plate incorporated the secondary particles each having a hollow region formed thereinside as mentioned above.

Figure 8:
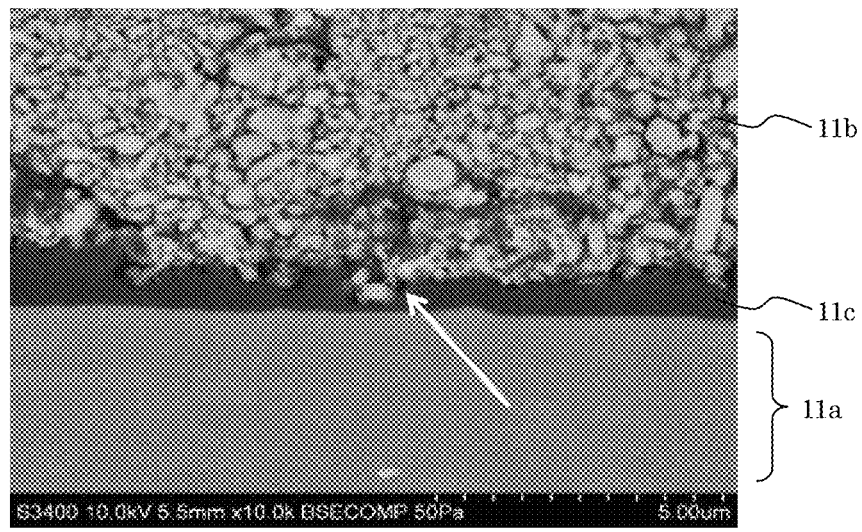
FIG. 8 is a picture of the cross section in the thickness direction of the positive electrode plate observed by SEM.
Figure 9:
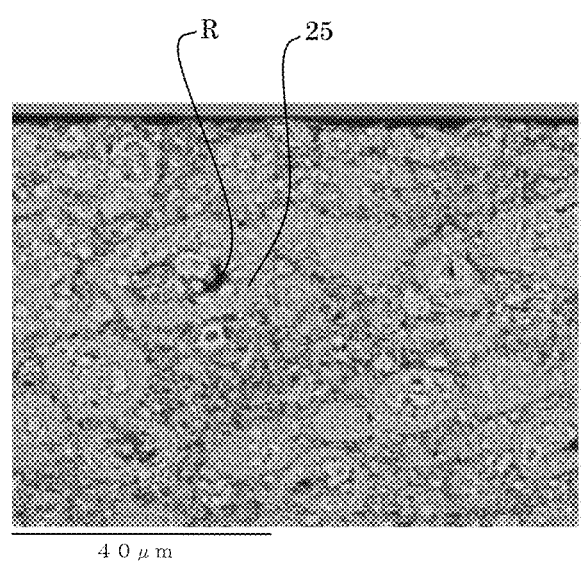
FIG. 9 is a picture of a cross section in the thickness direction of the positive electrode plate observed by SEM.

Particularly, as seen from FIG. 8 (indicated by the arrow), the primary particles as a constituent of the mixture layer were partially retained in the conductive layer. That is, the primary particles contained in the positive electrode mixture layer partially indent the conductive layer.

Figure 10:
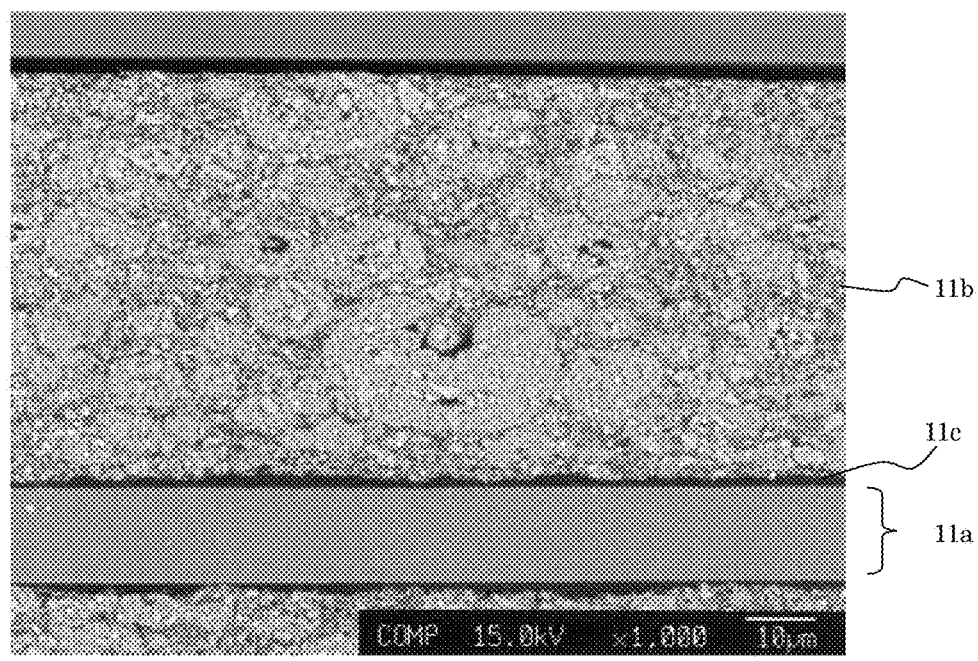
FIG. 10 is a picture showing a portion subjected to elemental analysis.
Figure 11:
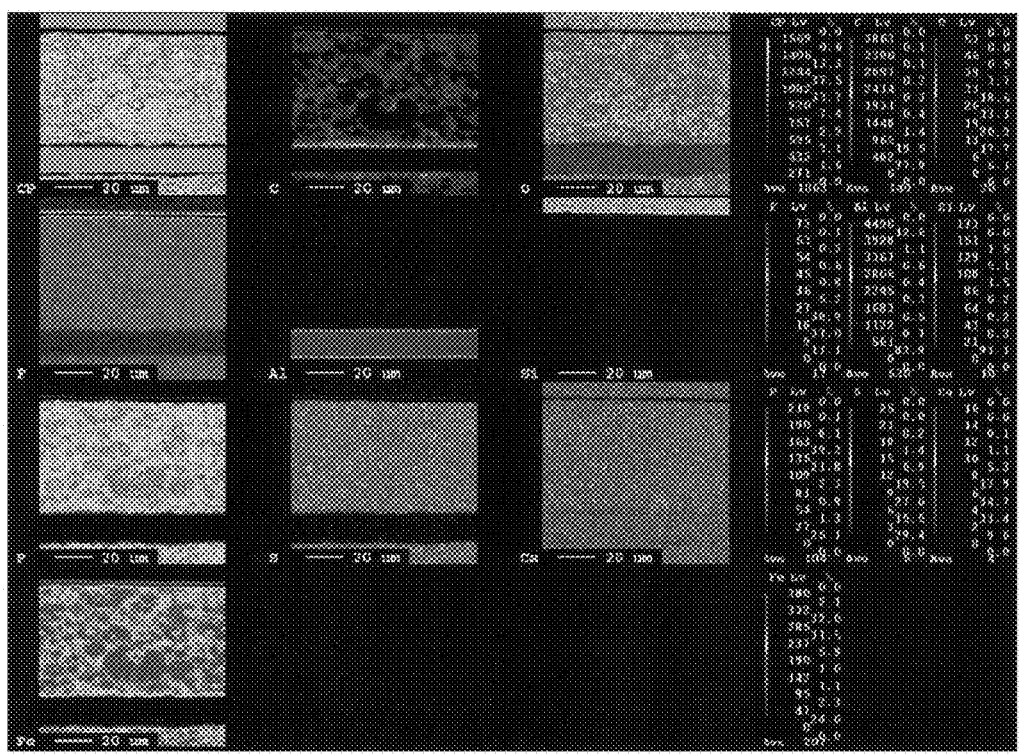
FIG. 11 is a picture showing the results of elemental analysis.

Further, the positive electrode plate produced in the same manner as the positive electrode plate observed by SEM was subjected to elemental analysis using an FE-EPMA (field emission electron probe microanalyzer), "JXA-8500F", manufactured by JEOL Ltd. FIG. 10 and FIG. 11 show the results.

FIG. 10 is a picture, observed by SEM, showing a portion subjected to elemental analysis. FIG. 11 shows the results of the elemental analysis of the portion shown in FIG. 10. The upper left picture in FIG. 11 is an image observed by SEM.

As seen from the analysis results shown in FIG. 11, particularly, for Fe and P (the first and second pictures from the bottom on the left side), the primary particles contained in the positive electrode mixture layer partially indent the conductive layer.

What is claimed is:

1. An electric storage device comprising:
   a first electrode plate;
   a second electrode plate having a polarity opposite to that of the first electrode plate; and
   a separator interposed between the first electrode plate and the second electrode plate,
   wherein the first electrode plate includes a current collector, a conductive layer laminated onto the current collector and including a conductive agent, and a mixture layer laminated onto the conductive layer,
   the conductive layer directly contacts both the current collector and the mixture layer,
   the mixture layer contains a binder and primary particles of an active material as its constituents,
   the primary particles indent a surface of the conductive layer such that the surface comprises a recessed portion formed by the primary particles,
   the mixture layer further contains secondary particles each having a hollow region formed therein by aggregation of a plurality of the primary particles of the active material,
   the secondary particles have an average particle size greater than the length equivalent to the thickness of the conductive layer, and
   the primary particles that have indented the surface of the conductive layer do not penetrate the surface of the conductive layer.

2. The electric storage device according to claim 1, wherein the active material contained in the mixture layer is lithium iron phosphate.

3. The electric storage device according to claim 1, wherein the primary particles have an average particle size of 100 to 500 nm.

4. The electric storage device according to claim 1, wherein a laminated product of the current collector, the conductive layer, and the mixture layer is compressed in the thickness direction by a compressive force of 50 to 500 kgf/cm.

5. The electric storage device according to claim 1, wherein the conductive layer contains carbon black.

6. The electric storage device according to claim 1, wherein the conductive layer has a thickness of 0.1 to 3.0 μm.

7. The electric storage device according to claim 1, wherein the first electrode plate comprises a positive electrode plate.

8. The electric storage device according to claim 1, wherein an average particle size of the secondary particles is in a range from 5 μm to 20 μm.

9. The electric storage device according to claim 1, further comprising:
a case;
an electrode assembly formed in the case and including the first and second electrode plates, and the separator; and
an electrolyte solution formed in the case and penetrating the hollow region.

10. The electric storage device according to claim 1, wherein a thickness of the mixture layer is in a range from 20 μm to 200 μm.

11. The electric storage device according to claim 1, wherein a Vickers hardness of the conductive layer is less than a Vickers hardness of the current collector.

12. The electric storage device according to claim 11, wherein a difference between the Vickers hardness of the current collector and a Vickers hardness of the conductive layer is in a range from 5 to 35.

13. The electric storage device according to claim 1, wherein a Vickers hardness of the conductive layer is in a range from 5 to 15.

14. The electric storage device according to claim 1, wherein the primary particles and the secondary particles undergo expansion and contraction due to charge and discharge.

15. The electric storage device according to claim 1, wherein the primary particles comprise lithium.

16. The electric storage device according to claim 1, wherein the conductive layer comprises a conductive agent and a binder, and
wherein the binder of the conductive layer binds the conductive agent to itself, binds the conductive agent to the current collector, and binds the conductive agent to the mixture layer.

17. The electric storage device according to claim 1, wherein the surface of the conductive layer comprises a first portion formed where the conductive layer has a first thickness, and a second portion formed where the conductive layer has a second thickness less than the first thickness.

18. The electric storage device according to claim 1, wherein the conductive layer comprises a compressed portion formed between the indented surface of the conductive layer and the current collector.

19. An electrode plate for an electrode assembly of an electric storage device, the electrode plate comprising:
a current collector;
a conductive layer laminated onto the current collector; and
a mixture layer laminated onto a surface of the conductive layer and including a conductive agent, the conductive layer directly contacting both the current collector and the mixture layer, the mixture layer comprising primary particles of an active material, and the primary particles indenting the surface of the conductive layer such that the surface comprises a recessed portion formed by the primary particles,
wherein the mixture layer further contains secondary particles each having a hollow region formed therein by aggregation of a plurality of the primary particles of the active material,
wherein the secondary particles have an average particle size greater than the length equivalent to the thickness of the conductive layer, and
wherein the primary particles that have indented the surface of the conductive layer do not penetrate the surface of the conductive layer.

* * * * *